US006887148B2

(12) United States Patent
Biasiotto et al.

(10) Patent No.: US 6,887,148 B2
(45) Date of Patent: May 3, 2005

(54) AIR-DISTRIBUTION DEVICE FOR MOTOR VEHICLES

(75) Inventors: Marco Biasiotto, Turin (IT); Francesco Butera, Turin (IT); Stefano Alacqua, Rivoli Cascine Vica (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/619,509

(22) Filed: Jul. 16, 2003

(65) Prior Publication Data

US 2004/0029520 A1 Feb. 12, 2004

(30) Foreign Application Priority Data

Jul. 16, 2002 (IT) ..................................... TO2002A0617

(51) Int. Cl.[7] ................................................. B60S 1/54
(52) U.S. Cl. ..................................... 454/121; 454/143
(58) Field of Search ................................. 454/155, 121, 454/156; 165/41, 42; 237/12.3 R, 12.3 B

(56) References Cited

U.S. PATENT DOCUMENTS

| 3,521,653 A | * | 7/1970 | Zoya et al. | 137/831 |
| 4,388,950 A | * | 6/1983 | Stouffer et al. | 137/829 |
| 4,852,638 A | * | 8/1989 | Hildebrand et al. | 165/42 |
| 5,259,815 A | * | 11/1993 | Stouffer et al. | 454/125 |
| 5,709,601 A | | 1/1998 | Heck | |
| 6,582,294 B2 | * | 6/2003 | Butera et al. | 454/155 |

FOREIGN PATENT DOCUMENTS

| JP | 56117039 A | 9/1981 | |
| JP | 62088606 A | 4/1987 | |
| JP | 6426006 A | 1/1989 | |
| WO | WO02072371 | * 9/2004 | B60H/1/00 |

OTHER PUBLICATIONS

European Search Report dated Nov. 12, 2003.

* cited by examiner

*Primary Examiner*—Derek S. Boles
(74) *Attorney, Agent, or Firm*—Sughrue Mion, PLLC

(57) ABSTRACT

Described herein is an air-distribution device which uses means designed for causing deviation, by Coanda effect, of a flow of air coming from an inlet duct into a plurality of outlet ducts. The invention is applicable both to a motor-vehicle air-conditioning assembly, which incorporates a conveyor with a heating element, and to a motor-vehicle dashboard.

7 Claims, 7 Drawing Sheets

Fig_5

AIR-DISTRIBUTION DEVICE FOR MOTOR VEHICLES

BACKGROUND OF THE INVENTION

The present invention relates to air-distribution devices for motor vehicles, of the type comprising a body with an inlet duct for inflow of air, a plurality of outlet ducts for outflow of air, and means designed for distributing the flow of air coming from the inlet duct into the various outlet ducts.

SUMMARY OF THE INVENTION

The purpose of the present invention is to provide a device of the type referred to above that will present a simple, light structure, with small overall dimensions, and nevertheless characterized by efficient and reliable operation.

In order to achieve the above purposes, according to a first aspect, the subject of the invention is an air-distribution device for motor vehicles, comprising a body with an inlet duct for inflow of air, three outlet ducts for outflow of air and means of perturbation of the flow of air coming from said inlet duct, the said means having three different operating positions, which cause deviation, by Coanda effect, of the flow of air selectively into the first, second, or third outlet duct.

The Coanda effect has been known and studied for some time. As a result of this phenomenon, a flow coming from a duct that gives out into an enlarged chamber, which has two side walls set at different distances from the outlet mouth of the duct, tends to adhere to the wall that is closer to the outlet mouth.

In the preferred of embodiment of the invention, the inlet duct has a mouth giving out into a first chamber, which has a first side wall right up against the aforesaid mouth and a second side wall opposite to the first wall and at a greater distance from the mouth, said first outlet duct having a side wall set on the prolongation of said first side wall of the first chamber and said means of perturbation having a first operating position in which said means are deactivated, so that the flow of air coming from the inlet duct follows, by Coanda effect, the aforesaid first wall of the first chamber and the side wall of the first outlet duct set on its prolongation, so that the flow is sent into said first outlet duct.

Once again in the case of the aforesaid preferred embodiment, the means of perturbation have a second operating position, in which they define a projection on said first side wall of the first chamber in such a way as to detach the flow of air from said first wall and favour its deviation, by Coanda effect, into the aforesaid second outlet duct, which has a wall set substantially on the prolongation of said second wall of the first chamber.

Once again in the case of the aforesaid preferred embodiment, the aforesaid first chamber communicates with the first outlet duct by means of a second mouth that opens out into a second chamber, which has a wall that joins the first side wall of the first chamber with the aforesaid side wall of the first outlet duct, and a second side wall set further away from said second mouth, which prolongs in a side wall of the third outlet duct, said means of perturbation having a third operating position, in which they define a projection on said first side wall of said second chamber so as to detach the flow of air from said side wall and favour its deviation towards the second wall of the second chamber and consequently into said third outlet duct.

Once again in the case of the aforesaid preferred embodiment, the aforesaid means of perturbation preferably comprise a rocking member, which is mounted so that it oscillates on the body of the device and which has opposite end portions designed to project from respective slits of said first wall of said first chamber and of said first wall of said second chamber.

According to a further aspect of the invention, the aforesaid inlet duct receives the flow of air from a conveyor, in which one or more heating elements are interposed. Said characteristic is protected, according to the invention, also with reference to the case in which the distribution device envisages just two outlet ducts and there are envisaged deviator means, which may be means for creating perturbation or means designed for altering the geometry of the duct for passage of the air, said latter means being designed for causing deviation of the flow of air by Coanda effect.

Again according to a further aspect of the invention, it is possible to envisage a distribution device with two or more outlet ducts, which uses means for perturbation of the flow of air that have more than one operating position and are incorporated in a motor-vehicle dashboard, with the aim of distributing the air towards the air-outflow mouths provided on said dashboard.

BRIEF DESCRIPTION OF THE DRAWINGS

Further characteristics and advantages of the invention will emerge clearly from the description that follows with reference to the annexed drawings, which are provided purely by way of non-limiting example and in which.

DETAILED DESCRIPTION OF THE INVENTION

Figure 1:
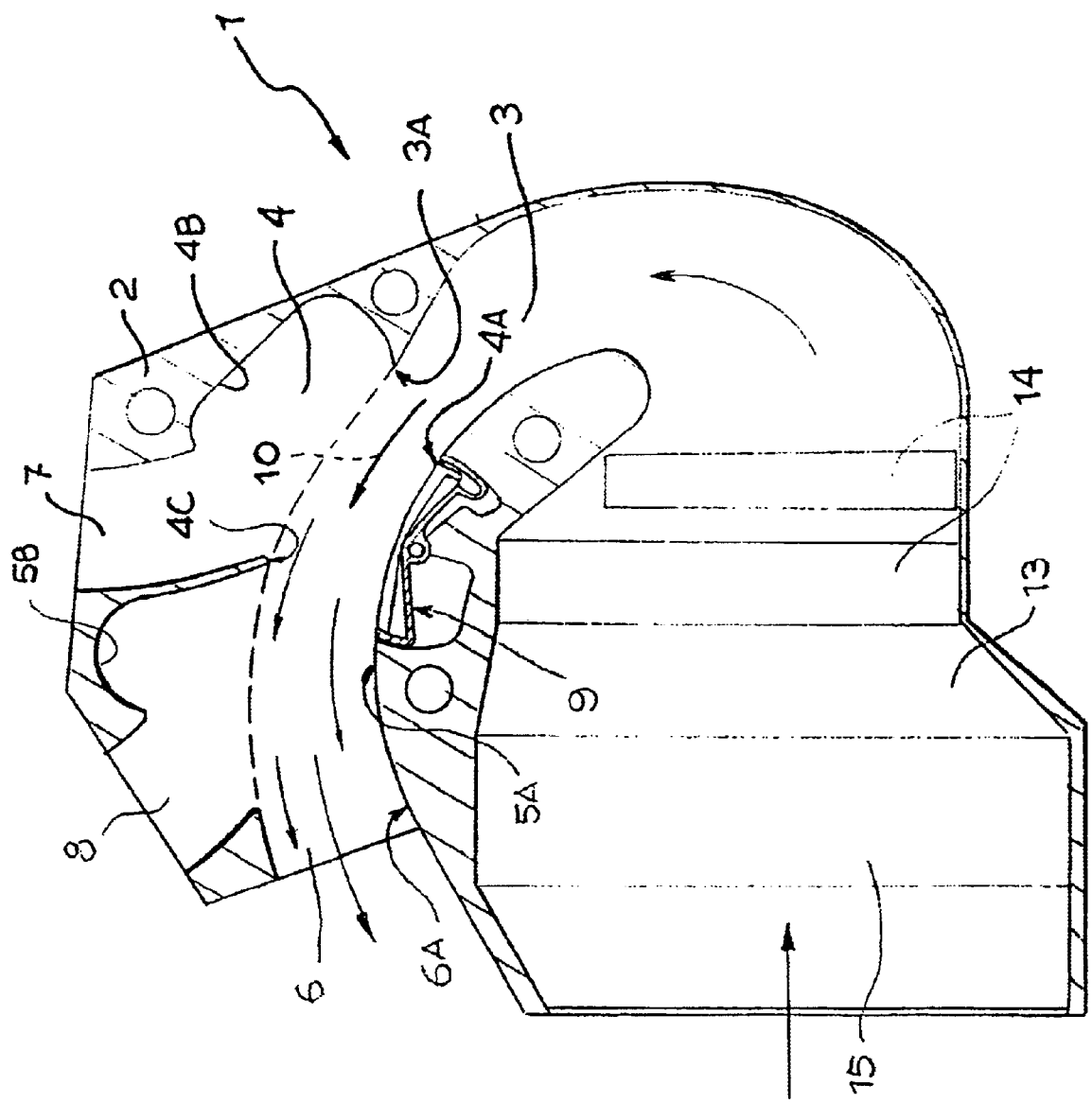
FIGS. 1–3 illustrate a cross-sectional view of a motor-vehicle air-conditioning assembly incorporating the device according to the invention, in three different operating conditions.
Figure 2:
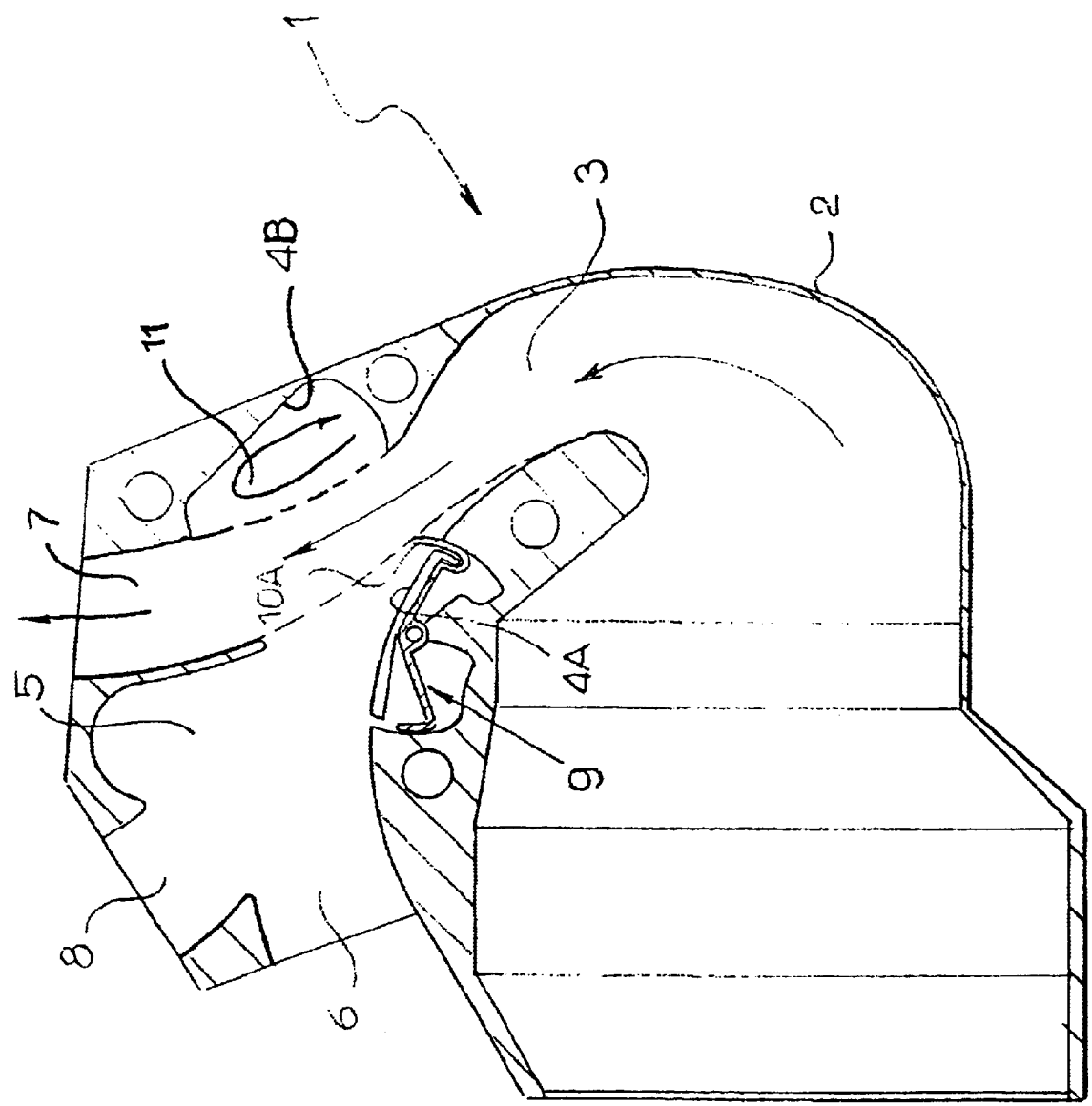
Figure 3:
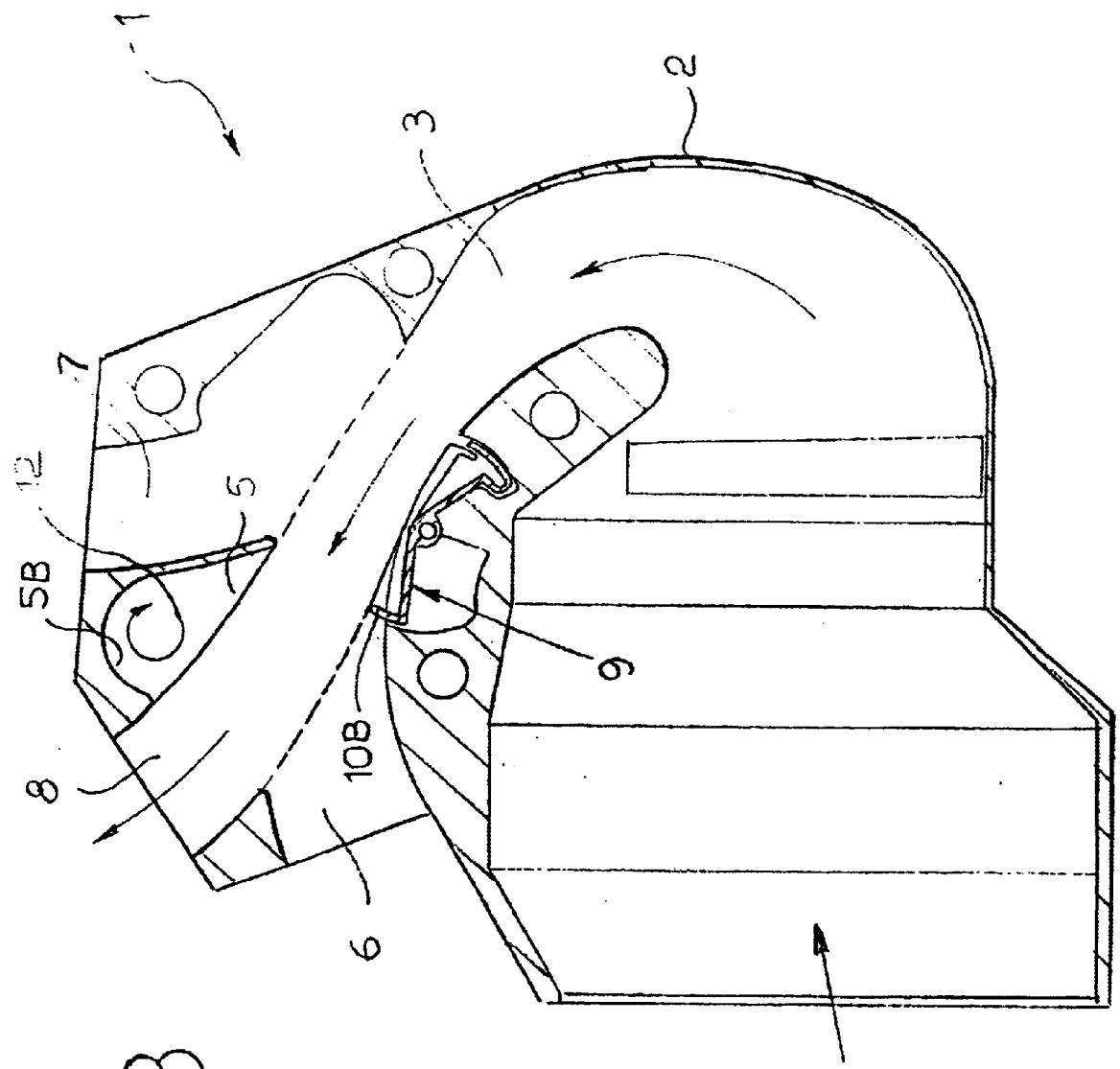

With reference to FIGS. 1-3, the reference number 1 designates, as a whole, a motor-vehicle air-conditioning assembly comprising a body 2, in which there is defined an inlet duct 3 for a flow of air. The duct 3 gives out by means of a mouth 3A into an enlarged chamber 4, which has a first wall 4A that is located right up against the mouth 3A, and a second wall 4B opposite thereto, which is located at a greater distance from the mouth 3A. The chamber 4 gives out, by means of a second mouth 4C, into a second chamber 5.

The device comprises a first outlet duct 6, a second outlet duct 7, and a third outlet duct 8. The chamber 5 has a first wall 5A, which is right up against the mouth 4A, and a second side wall 5B, which is located at a greater distance from the mouth 4B. As may moreover be seen in the drawings, the first outlet duct 6 has a side wall 6A, which is set on the prolongation of the side wall 5A of the second chamber 5 and of the side wall 4A of the first chamber 4. The latter in turn is set on the prolongation of a corresponding side wall of the inlet duct 3. Said walls are set, one on the prolongation of the other, according to a curved pattern, as may be seen in FIGS. 1 to 3.

The device comprises an element for perturbation of the flow, consisting of a rocker member 9, which is mounted so that it oscillates about an axis 10 on the body 2 of the device and which has end portions 10A and 10B (see FIGS. 2 and 3) designed to project through respective slits made in the first side wall 4A of the chamber 4 and in the first side wall 5A of the chamber 5, for reasons that will emerge clearly from what follows.

The perturbation member 9 is designed to assume three different operating positions, which are respectively illustrated in FIGS. 1, 2 and 3 for causing deviation of the flow coming from the inlet duct 3 in the first outlet duct 6 (FIG. 1), or else in the second outlet duct 7 (FIG. 2), or else in the third outlet duct 8 (FIG. 3).

FIG. 1 illustrates the perturbation member 9 in a first operating condition that corresponds to an intermediate position, in which neither of the two end portions 10A, 10B of the perturbation member 9 projects from the respective wall. In said condition, the flow tends to remain adherent to the curved wall defined by the wall 4A, the wall 5A, and the wall 6A. This occurs by Coanda effect, in so far as the flow that gives out into the chamber 4 tends to remain adherent to the side wall closer to the outflow mouth 3A, and the same occurs when the flow gives out through the mouth 4A into the second chamber 5.

Starting from the condition described above and illustrated in FIG. 1, the perturbation member 9 can be made to oscillate into one or into the other of the two end positions illustrated in FIGS. 2 and 3. In the case of the position illustrated in FIG. 2, the end portion 10A projects from the first side wall 4A of the chamber 4 so that it causes a detachment of the flow of air from the wall 4A and a consequent attraction, again by Coanda effect, of the flow of air towards the second outlet duct 7, with consequent formation of an area of negative pressure 11 in the part of the chamber 4 more adjacent to the wall 4B.

FIG. 3 illustrates the opposite situation, in which the end portion 10B projects from the wall 5A, causing detachment of the flow of air from said wall and its consequent attraction towards the outlet duct 8, with consequent formation of an area of negative pressure 12 in the part of the chamber 5 more adjacent to the wall 5B.

According to a further characteristic illustrated in the drawings, englobed in the body 2 of the device is a conveyor 13, which contains heating elements 14 for heating the flow of air, as well as an evaporator 15 forming part of the air-conditioning system.

The provision of an air-conditioner assembly which incorporates both deviator means by Coanda effect and a heating element forms the subject of the present invention independently of the provision of the three outlet ducts described above and of the corresponding perturbation rocker member.

Figure 4:
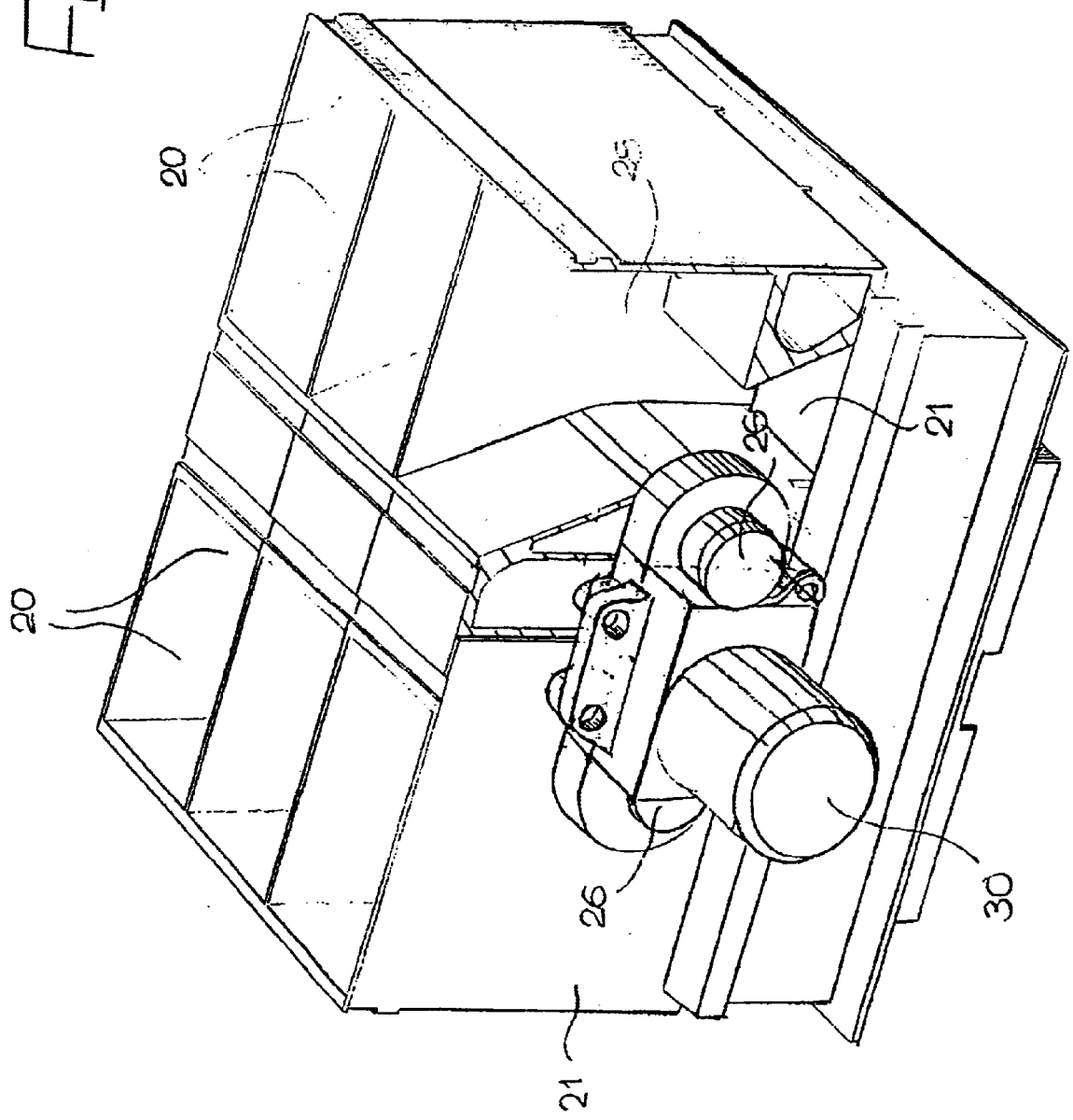
FIGS. 4 and 5 present, respectively, a perspective view and a cross-sectional view of a second embodiment of a device according to the invention built into a motor-vehicle air-conditioning assembly.
Figure 5:
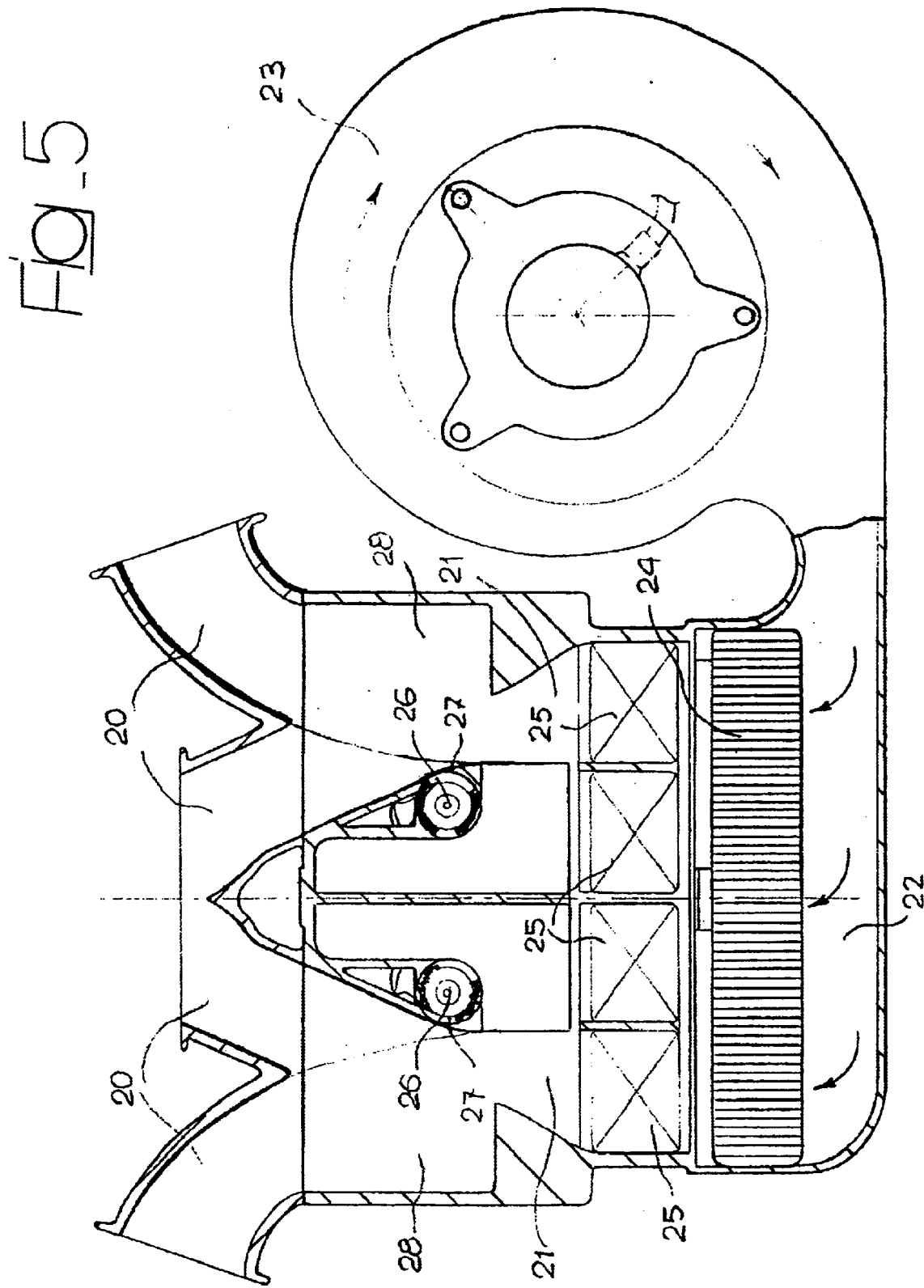

FIGS. 4 and 5 illustrate an example of embodiment in which the air-conditioner assembly has a plurality of outlet ducts 20, which branch off two by two from a common inlet duct 21, which receives air by means of a conveyor 22, associated to which is a fan assembly 23. Inserted in the conveyor 22 is an evaporator 24 and a plurality of independent heating elements 25, each of which controls a respective inlet duct 21 (FIG. 2 illustrates just two of the four inlet ducts 21). For each inlet duct 21, the distribution of air in the two outlet ducts associated thereto is controlled by a fluid device 26 consisting of a roller-type open/close element designed to open or close a window 27 on one side of a chamber 28, into which there gives out the inlet duct 21 and from which there branch off the two outlet ducts 20. When the open/close element 26 is in the condition in which it keeps the window 27 closed, the flow coming from the inlet duct tends to remain adherent to the side wall of the chamber 28 that is closer to the mouth of the inlet duct 21. When the window 27 is open, the side wall closer to the outlet of the duct 21 becomes the opposite wall, so that the flow is deviated into the second outlet duct. It should be noted that a roller-type fluid element of the kind described above has already been illustrated in the international patent application of the present application No., which was still secret at the date of filing of the present patent application. FIG. 4 illustrates also the motor assembly 30, which controls the angular position of the two roller-type open/close elements 26, for example by means of a mechanism of the type illustrated in the aforesaid international patent application, which does not form a subject of the present invention.

Figure 6:
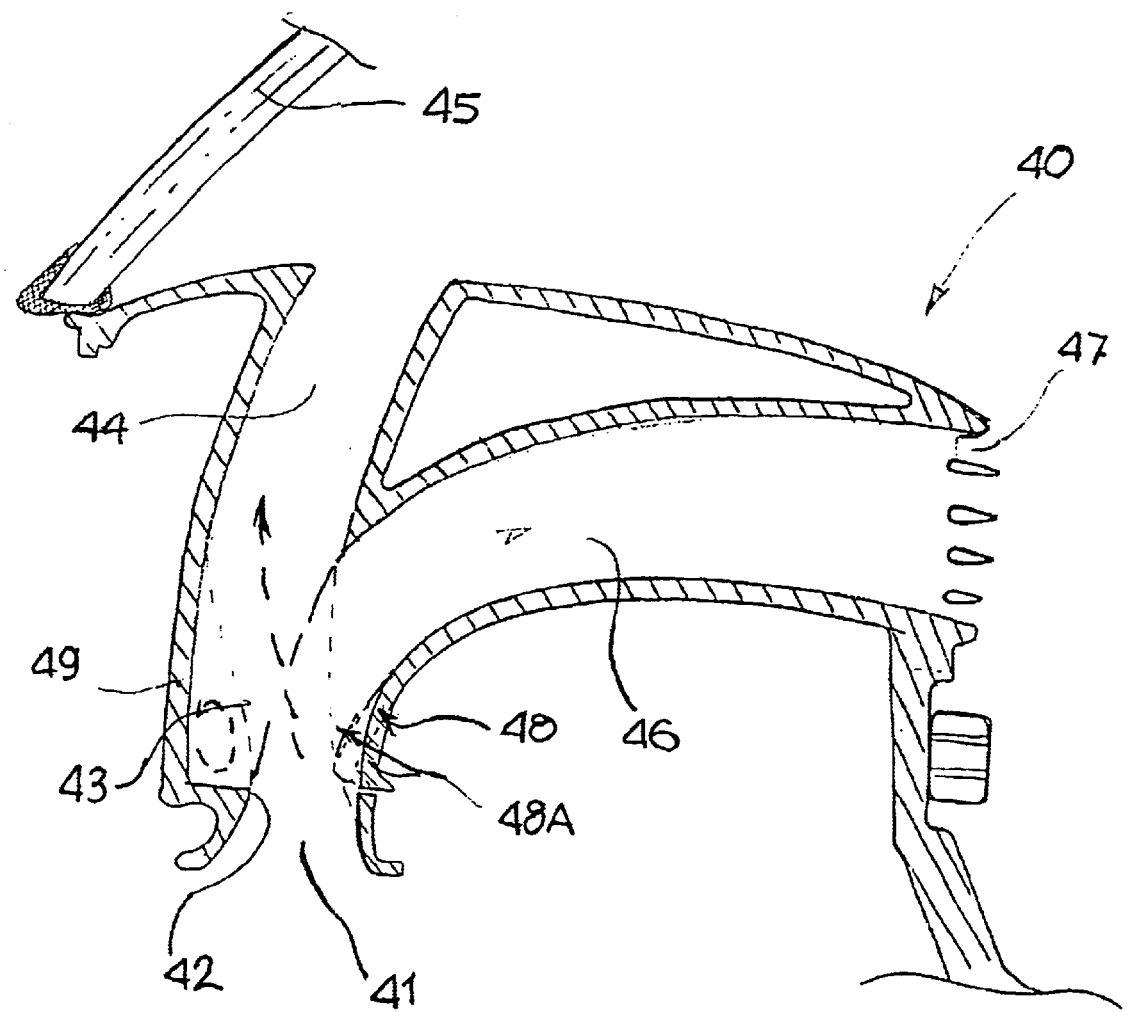
FIGS. 6 and 7 illustrate two further embodiments of a device according to the invention built into a motor-vehicle dashboard.
Figure 7:
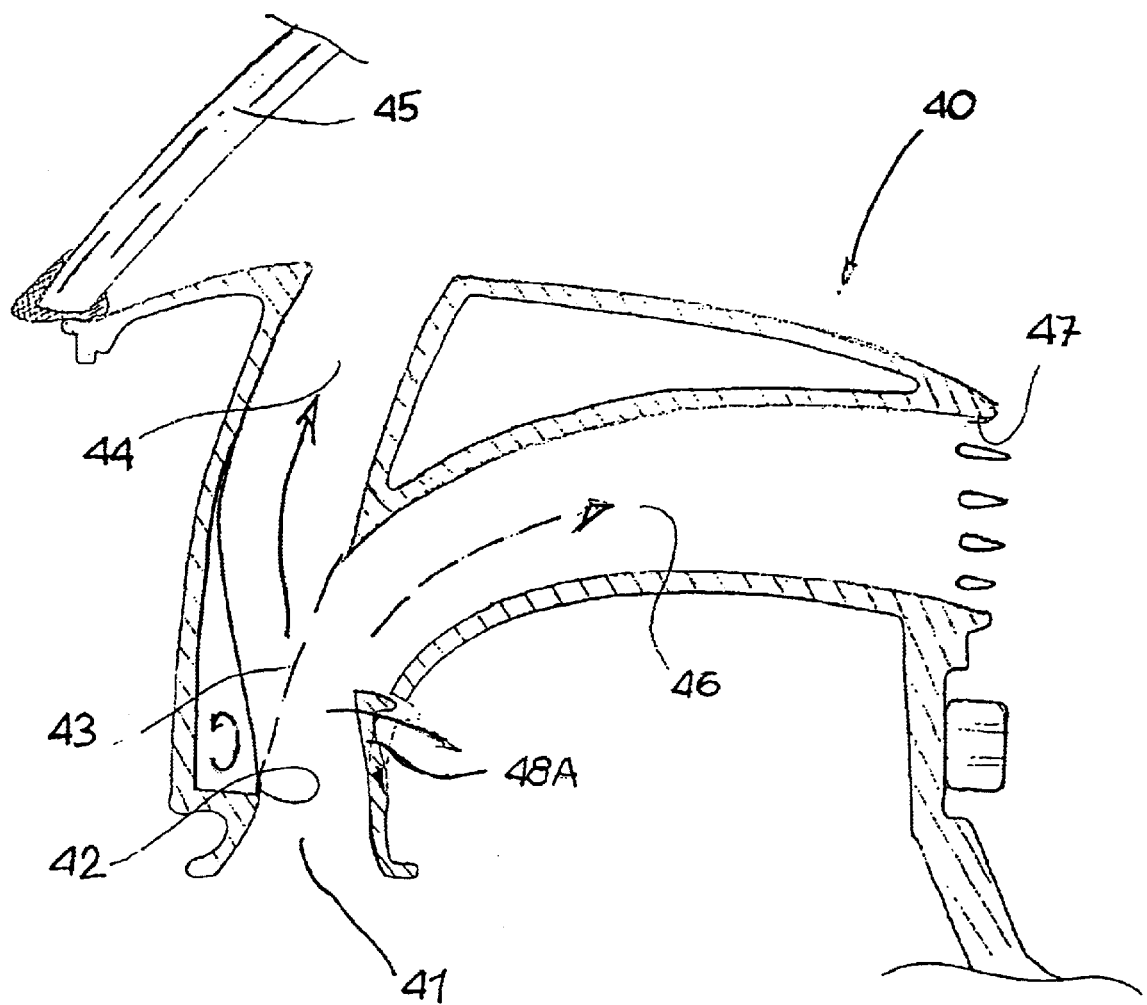

Finally, FIGS. 6 and 7 illustrate a third embodiment of the invention, which is applied in this case to the distribution of air to the outflow mouths arranged above a motor-vehicle dashboard. In said figures, the reference number 40 designates a motor-vehicle dashboard, illustrated in cross-sectional view, in a vertical plane parallel to the longitudinal direction of the motor vehicle. Inside the body of the dashboard there is obtained an inlet duct 41 for a flow of air, which gives out, by means of a mouth 42, into a chamber 43, from which there branch off a first outlet duct 44 that gives out on the top surface of the dashboard 40, immediately underneath the windscreen 45 of the motor vehicle, and in a second outlet duct 46 that conducts the flow of air to aeration mouths 47 set on the front wall of the dashboard, facing the driver.

The chamber 43, which gives out into an inlet duct 41, has a side wall 48 immediately adjacent to the mouth 42, in a side wall 49 opposite thereto, which is, instead, at a greater distance from the mouth 41. Incorporated in the wall 48 is a fin 48A that can be deflected, which can be displaced between the inoperative condition, illustrated in FIG. 6, in which it does not project inside the chamber 43, and an operative condition, illustrated with a dashed line once again in FIG. 6, in which it does project into said chamber. In the first condition, the flow that comes from the duct 41 tends to remain adherent to the wall 48 closer thereto, so that it is deviated into the duct 46. When the fin 48A is, instead, in the operative condition, illustrated with a dashed line, it causes detachment of the flow from the wall 48 and its consequent attraction towards the opposite wall and inside the outlet duct 44. The displacement of the fin 48A between the two operating positions can be obtained in any way, for example by cam means (not illustrated). FIG. 7 is substantially similar to FIG. 6, except for the different disposition of the fin 48A, which in this case has its anchoring area facing the inlet duct 41. With said disposition, it is also possible to envisage an analogical regulation, i.e., the possibility of regulating continuously the amount of air distributed into the two ducts, between a first extreme condition, in which the entire flow of air enters the duct 46, and a second extreme condition, in which the entire flow of air enters the duct 44. In this configuration, in fact, the jet tends to remain attached to the wall 48, once again by Coanda effect.

Of course, without prejudice to the principle of the invention, the details of construction and the embodiments may vary widely with respect to what is described and illustrated herein purely by way of example, without thereby departing from the scope of the present invention.

What is claimed is:

1. An air-distribution device for motor vehicles, comprising a body with an inlet duct for a flow of air, three outlet ducts for outflow of the air and a single movable member for perturbation of the flow of air coming from said inlet duct, said single movable member for perturbation having three different operating positions, which cause deviation, by Coanda effect, of the flow of air selectively into the first, second or third outlet duct.

2. The device according to claim 1, wherein the inlet duct has a mouth giving out into a first chamber, which has a first side wall right up against the mouth and a second side wall opposite to the first wall and located at a greater distance from the mouth, said first outlet duct having a side wall set on the prolongation of said first side wall of said first chamber, said single movable member for perturbation having a first operating position in which they are deactivated, so that the flow of air coming from the inlet duct follows, by Coanda effect, the first wall of said first chamber and the side wall of the first outlet duct set on its prolongation, so that the flow is sent into said first outlet duct.

3. The device according to claim 2, wherein the single movable member for perturbation have a second operating position, in which a projection is defined on said first side wall of the first chamber, in such a way as to detach the flow of air from said first wall and favour its deviation, by Coanda effect, into the second outlet duct, which has a wall set substantially on the prolongation of said second wall of the first chamber.

4. The device according to claim 3, wherein said first chamber communicates with the first outlet duct by means of a second mouth that opens out into a second chamber, which has a wall that joins the first side wall of the first chamber with the side wall of the first outlet duct, and a second side wall, set further away from said second mouth, which is prolonged into a side wall of the third outlet duct, said singe movable member for perturbation having a third operating position, in which a projection is defined on said first side wall of said second chamber so as to detach the flow of air from said side wall and favour its deviation towards the second wall of the second chamber and consequently into said third outlet duct.

5. The device according to claim 4, wherein said single movable member for perturbation comprise a rocking member, which is mounted so that it oscillates on the body of the device and which has opposite end portions designed to project from respective slits of said first wall of said first chamber and of said first wall of said second chamber.

6. A motor-vehicle dashboard, comprising a plurality of outlet mouths for air and at least one air-deviator device comprising an inlet duct and a plurality of outlet ducts, and means for perturbation of the flow of air, said means of perturbation having more than one operating positions, in which they cause the deviation, by Coanda effect, of the flow of air coming from the inlet duct into a selected one of said outlet ducts wherein said means of perturbation comprise a fin forming part of a side wall of a chamber, into which the inlet duct gives out and from which there branch off the outlet ducts, said side wall, which carries the aforesaid fin being located right up against the mouth with which the inlet duct gives out into said chamber, the opposite wall of said chamber being, instead, set further away from said mouth, in such a way that, in a first operating condition, of said perturbation member (in which it does not project inside the chamber), the flow of air is deviated into a first outlet duct, which has a wall set on the prolongation of said wall carrying the fin, whereas, in a second operating condition, in which the fin projects into said chamber, the flow of air is detached from said wall that carries the fin and attracted towards the opposite wall of the chamber, with consequent conveyance into the other outlet duct.

7. The motor-vehicle dashboard according to claim 6, wherein the fin has an anchoring end that is closer to the mouth of the inlet duct, and a mobile opposite end, which is further away from the mouth, in such a way that the fin may be displaced continuously between two end positions, which cause a continuous adjustment of the amount of air that is distributed into two outlet ducts, between two extreme conditions corresponding to the conveyance of the entire flow of air into one or into the other outlet duct, deviation of the flow being obtained by adhesion of the jet (Coanda effect) on the mobile plate.

* * * * *